(12) United States Patent
Pandya et al.

(10) Patent No.: US 10,936,071 B2
(45) Date of Patent: Mar. 2, 2021

(54) WEARABLE ELECTRONIC DEVICE WITH HAPTIC ROTATABLE INPUT

(71) Applicant: Apple Inc., Cupertino, CA (US)

(72) Inventors: Sameer Pandya, Sunnyvale, CA (US); Erik G. de Jong, San Francisco, CA (US); Colin M. Ely, Sunnyvale, CA (US); Benjamin G. Jackson, Belmont, CA (US); Lei Ma, San Jose, CA (US); Steven C. Roach, San Francisco, CA (US); Steven P. Cardinali, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/377,197

(22) Filed: Apr. 6, 2019

(65) Prior Publication Data

US 2020/0073477 A1    Mar. 5, 2020

Related U.S. Application Data

(60) Provisional application No. 62/725,262, filed on Aug. 30, 2018.

(51) Int. Cl.
*G06F 3/01* (2006.01)
*G04G 21/08* (2010.01)
*G04G 21/00* (2010.01)

(52) U.S. Cl.
CPC ............ *G06F 3/016* (2013.01); *G04G 21/00* (2013.01); *G04G 21/08* (2013.01)

(58) Field of Classification Search
CPC ......... G06F 3/016; G04G 21/00; G04G 21/08
See application file for complete search history.

(56) References Cited

U.S. PATENT DOCUMENTS

| 5,196,745 | A  | 3/1993 | Trumper et al. |
| 5,293,161 | A  | 3/1994 | MacDonald et al. |
| 5,424,756 | A  | 6/1995 | Ho et al. |
| 5,434,549 | A  | 7/1995 | Hirabayashi et al. |
| 5,436,622 | A  | 7/1995 | Gutman et al. |
| 5,668,423 | A  | 9/1997 | You et al. |
| 5,842,967 | A  | 1/1998 | Kroll |
| 5,739,759 | A  | 4/1998 | Nakazawa et al. |
| 6,084,319 | A  | 7/2000 | Kamata et al. |
| 6,342,880 | B2 | 1/2002 | Rosenberg et al. |

(Continued)

FOREIGN PATENT DOCUMENTS

| CN | 101036105 | 9/2007 |
| CN | 201044066 | 4/2008 |

(Continued)

OTHER PUBLICATIONS

Author Unknown, "3D Printed Mini Haptic Actuator," Autodesk, Inc., 16 pages, 2016.

(Continued)

*Primary Examiner* — Sahlu Okebato
(74) *Attorney, Agent, or Firm* — Brownstein Hyatt Farber Schreck, LLP

(57) ABSTRACT

One embodiment described herein takes the form of a watch, comprising: a housing; a crown comprising: a crown body outside the housing; and a shaft extending from the crown body into the housing; and an actuator coupled to the crown and configured to provide haptic output through the crown.

18 Claims, 13 Drawing Sheets

(56) References Cited

U.S. PATENT DOCUMENTS

| | | |
|---|---|---|
| 6,373,465 B2 | 4/2002 | Jolly et al. |
| 6,388,789 B1 | 5/2002 | Bernstein |
| 6,438,393 B1 | 8/2002 | Surronen |
| 6,445,093 B1 | 9/2002 | Binnard |
| 6,493,612 B1 | 12/2002 | Bisset et al. |
| 6,554,191 B2 | 4/2003 | Yoneya |
| 6,693,622 B1 | 2/2004 | Shahoian et al. |
| 6,777,895 B2 | 8/2004 | Shimoda et al. |
| 6,822,635 B2 | 11/2004 | Shahoian |
| 6,864,877 B2 | 3/2005 | Braun et al. |
| 6,952,203 B2 | 10/2005 | Banerjee et al. |
| 6,988,414 B2 | 1/2006 | Ruhrig et al. |
| 7,068,168 B2 | 6/2006 | Girshovich et al. |
| 7,080,271 B2 | 7/2006 | Kardach et al. |
| 7,126,254 B2 | 10/2006 | Nanataki et al. |
| 7,130,664 B1 | 10/2006 | Williams |
| 7,196,688 B2 | 3/2007 | Shena et al. |
| 7,202,851 B2 | 4/2007 | Cunningham et al. |
| 7,234,379 B2 | 6/2007 | Claesson et al. |
| 7,253,350 B2 | 8/2007 | Noro et al. |
| 7,276,907 B2 | 10/2007 | Kitagawa et al. |
| 7,321,180 B2 | 1/2008 | Takeuchi et al. |
| 7,323,959 B2 | 1/2008 | Naka et al. |
| 7,336,006 B2 | 2/2008 | Watanabe et al. |
| 7,339,572 B2 | 3/2008 | Schena |
| 7,355,305 B2 | 4/2008 | Nakamura et al. |
| 7,360,446 B2 | 4/2008 | Dai et al. |
| 7,370,289 B1 | 5/2008 | Ebert et al. |
| 7,392,066 B2 | 6/2008 | Hapamas |
| 7,423,631 B2 | 9/2008 | Shahoian et al. |
| 7,508,382 B2 | 3/2009 | Denoue et al. |
| 7,570,254 B2 | 8/2009 | Suzuki et al. |
| 7,576,477 B2 | 8/2009 | Koizumi |
| 7,656,388 B2 | 2/2010 | Schena et al. |
| 7,667,371 B2 | 2/2010 | Sadler et al. |
| 7,667,691 B2 | 2/2010 | Boss et al. |
| 7,675,414 B2 | 3/2010 | Ray |
| 7,710,397 B2 | 5/2010 | Krah et al. |
| 7,710,399 B2 | 5/2010 | Bruneau et al. |
| 7,741,938 B2 | 6/2010 | Kramlich |
| 7,755,605 B2 | 7/2010 | Daniel et al. |
| 7,798,982 B2 | 9/2010 | Zets et al. |
| 7,825,903 B2 | 11/2010 | Anastas et al. |
| 7,855,657 B2 | 12/2010 | Doemens et al. |
| 7,890,863 B2 | 2/2011 | Grant et al. |
| 7,893,922 B2 | 2/2011 | Klinghult et al. |
| 7,904,210 B2 | 3/2011 | Pfau et al. |
| 7,911,328 B2 | 3/2011 | Luden et al. |
| 7,919,945 B2 | 4/2011 | Houston et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,976,230 B2 | 7/2011 | Ryynanen et al. |
| 8,002,089 B2 | 8/2011 | Jasso et al. |
| 8,020,266 B2 | 9/2011 | Ulm et al. |
| 8,040,224 B2 | 10/2011 | Hwang |
| 8,053,688 B2 | 11/2011 | Conzola et al. |
| 8,063,892 B2 | 11/2011 | Shahoian |
| 8,072,418 B2 | 12/2011 | Crawford et al. |
| 8,081,156 B2 | 12/2011 | Ruettiger |
| 8,125,453 B2 | 2/2012 | Shahoian et al. |
| 8,154,537 B2 | 4/2012 | Olien et al. |
| 8,174,495 B2 | 5/2012 | Takashima et al. |
| 8,174,512 B2 | 5/2012 | Ramstein et al. |
| 8,188,989 B2 | 5/2012 | Levin |
| 8,169,402 B2 | 6/2012 | Shahoian et al. |
| 8,217,892 B2 | 7/2012 | Meadors |
| 8,217,910 B2 | 7/2012 | Stallings et al. |
| 8,232,494 B2 | 7/2012 | Purcocks |
| 8,248,386 B2 | 8/2012 | Harrison |
| 8,253,686 B2 | 8/2012 | Kyung |
| 8,262,480 B2 | 9/2012 | Cohen et al. |
| 8,264,465 B2 | 9/2012 | Grant et al. |
| 8,265,292 B2 | 9/2012 | Leichter |
| 8,265,308 B2 | 9/2012 | Gitzinger et al. |
| 8,344,834 B2 | 1/2013 | Niiyama |
| 8,345,025 B2 | 1/2013 | Seibert et al. |
| 8,351,104 B2 | 1/2013 | Zaifrani et al. |
| 8,378,797 B2 | 2/2013 | Pance et al. |
| 8,378,965 B2 | 2/2013 | Gregorio et al. |
| 8,384,316 B2 | 2/2013 | Houston et al. |
| 8,390,218 B2 | 3/2013 | Houston et al. |
| 8,390,572 B2 | 3/2013 | Marsden et al. |
| 8,390,594 B2 | 3/2013 | Modarres et al. |
| 8,400,027 B2 | 3/2013 | Dong et al. |
| 8,405,618 B2 | 3/2013 | Colgate et al. |
| 8,421,609 B2 | 4/2013 | Kim et al. |
| 8,432,365 B2 | 4/2013 | Kim et al. |
| 8,469,806 B2 | 6/2013 | Grant et al. |
| 8,471,690 B2 | 6/2013 | Hennig et al. |
| 8,493,177 B2 | 7/2013 | Flaherty et al. |
| 8,493,189 B2 | 7/2013 | Suzuki |
| 8,576,171 B2 | 11/2013 | Grant |
| 8,598,750 B2 | 12/2013 | Park |
| 8,598,972 B2 | 12/2013 | Cho et al. |
| 8,604,670 B2 | 12/2013 | Mahameed et al. |
| 8,605,141 B2 | 12/2013 | Dialameh et al. |
| 8,614,431 B2 | 12/2013 | Huppi et al. |
| 8,619,031 B2 | 12/2013 | Hayward |
| 8,624,448 B2 | 1/2014 | Kaiser et al. |
| 8,628,173 B2 | 1/2014 | Stephens et al. |
| 8,633,916 B2 | 1/2014 | Bernstein et al. |
| 8,639,485 B2 | 1/2014 | Connacher et al. |
| 8,648,829 B2 | 2/2014 | Shahoian et al. |
| 8,653,785 B2 | 2/2014 | Collopy |
| 8,654,524 B2 | 2/2014 | Pance et al. |
| 8,681,130 B2 | 3/2014 | Adhikari |
| 8,686,952 B2 | 4/2014 | Burrough |
| 8,717,151 B2 | 5/2014 | Forutanpour et al. |
| 8,730,182 B2 | 5/2014 | Modarres et al. |
| 8,749,495 B2 | 6/2014 | Grant et al. |
| 8,754,759 B2 | 6/2014 | Fadell et al. |
| 8,760,037 B2 | 6/2014 | Eshed et al. |
| 8,773,247 B2 | 7/2014 | Ullrich |
| 8,780,074 B2 | 7/2014 | Castillo et al. |
| 8,797,153 B2 | 8/2014 | Vanhelle et al. |
| 8,797,295 B2 | 8/2014 | Bernstein |
| 8,803,670 B2 | 8/2014 | Steckel et al. |
| 8,834,390 B2 | 9/2014 | Couvillon |
| 8,836,502 B2 | 9/2014 | Culbert et al. |
| 8,836,643 B2 | 9/2014 | Romera Joliff et al. |
| 8,867,757 B1 | 10/2014 | Ooi |
| 8,872,448 B2 | 10/2014 | Boldyrev et al. |
| 8,878,401 B2 | 11/2014 | Lee |
| 8,890,824 B2 | 11/2014 | Guard |
| 8,907,661 B2 | 12/2014 | Maier et al. |
| 8,976,139 B2 | 3/2015 | Koga et al. |
| 8,976,141 B2 | 3/2015 | Myers et al. |
| 8,977,376 B1 | 3/2015 | Lin et al. |
| 8,981,682 B2 | 3/2015 | Delson et al. |
| 8,987,951 B2 | 3/2015 | Park |
| 9,008,730 B2 | 4/2015 | Kim et al. |
| 9,024,738 B2 | 5/2015 | Van Schyndel et al. |
| 9,046,947 B2 | 6/2015 | Takeda |
| 9,049,339 B2 | 6/2015 | Muench |
| 9,052,785 B2 | 6/2015 | Horie |
| 9,054,605 B2 | 6/2015 | Jung et al. |
| 9,058,077 B2 | 6/2015 | Lazaridis et al. |
| 9,086,727 B2 | 7/2015 | Tidemand et al. |
| 9,092,056 B2 | 7/2015 | Myers et al. |
| 9,104,285 B2 | 8/2015 | Colgate et al. |
| 9,116,570 B2 | 8/2015 | Lee et al. |
| 9,122,330 B2 | 9/2015 | Bau et al. |
| 9,134,796 B2 | 9/2015 | Lemmons et al. |
| 9,172,669 B2 | 10/2015 | Swink et al. |
| 9,182,837 B2 | 11/2015 | Day |
| 9,218,727 B2 | 12/2015 | Rothkopf et al. |
| 9,245,704 B2 | 1/2016 | Maharjan et al. |
| 9,256,287 B2 | 2/2016 | Shinozaki et al. |
| 9,274,601 B2 | 3/2016 | Faubert et al. |
| 9,280,205 B2 | 3/2016 | Rosenberg et al. |
| 9,286,907 B2 | 3/2016 | Yang et al. |
| 9,304,587 B2 | 4/2016 | Wright et al. |
| 9,319,150 B2 | 4/2016 | Peeler et al. |

(56) References Cited

U.S. PATENT DOCUMENTS

| | | |
|---|---|---|
| 9,361,018 B2 | 6/2016 | Pasquero et al. |
| 9,396,629 B1 | 7/2016 | Weber et al. |
| 9,430,042 B2 | 8/2016 | Levin |
| 9,436,280 B2 | 9/2016 | Tartz et al. |
| 9,442,570 B2 | 9/2016 | Slonneger |
| 9,448,713 B2 | 9/2016 | Cruz-Hernandez et al. |
| 9,449,476 B2 | 9/2016 | Lynn et al. |
| 9,459,734 B2 | 10/2016 | Day |
| 9,466,783 B2 | 10/2016 | Olien et al. |
| 9,489,049 B2 | 11/2016 | Li |
| 9,496,777 B2 | 11/2016 | Jung |
| 9,501,149 B2 | 11/2016 | Burnbaum et al. |
| 9,513,704 B2 | 12/2016 | Heubel et al. |
| 9,519,346 B2 | 12/2016 | Lacroix |
| 9,535,500 B2 | 1/2017 | Pasquero et al. |
| 9,539,164 B2 | 1/2017 | Sanders et al. |
| 9,542,028 B2 | 1/2017 | Filiz et al. |
| 9,557,830 B2 | 1/2017 | Grant |
| 9,557,857 B2 | 1/2017 | Schediwy |
| 9,563,274 B2 | 2/2017 | Senanayake |
| 9,564,029 B2 | 2/2017 | Morrell et al. |
| 9,594,429 B2 | 3/2017 | Bard et al. |
| 9,600,037 B2 | 3/2017 | Pance et al. |
| 9,600,071 B2 | 3/2017 | Rothkopf |
| 9,607,491 B1 | 3/2017 | Mortimer |
| 9,632,583 B2 | 4/2017 | Virtanen et al. |
| 9,639,158 B2 | 5/2017 | Levesque |
| 9,666,040 B2 | 5/2017 | Flaherty et al. |
| 9,707,593 B2 | 7/2017 | Berte |
| 9,710,061 B2 | 7/2017 | Pance et al. |
| 9,727,238 B2 | 8/2017 | Peh et al. |
| 9,733,704 B2 | 8/2017 | Cruz-Hernandez et al. |
| 9,762,236 B2 | 9/2017 | Chen |
| 9,829,981 B1 | 11/2017 | Ji |
| 9,857,872 B2 | 1/2018 | Terlizzi et al. |
| 9,870,053 B2 | 1/2018 | Modarres |
| 9,874,980 B2 | 1/2018 | Brunet et al. |
| 9,875,625 B2 | 1/2018 | Khoshkava et al. |
| 9,886,090 B2 | 2/2018 | Silvanto et al. |
| 9,902,186 B2 | 2/2018 | Whiteman et al. |
| 9,904,393 B2 | 2/2018 | Frey et al. |
| 9,878,239 B2 | 3/2018 | Heubel et al. |
| 9,921,649 B2 | 3/2018 | Grant et al. |
| 9,927,887 B2 | 3/2018 | Bulea |
| 9,927,902 B2 | 3/2018 | Burr et al. |
| 9,928,950 B2 | 3/2018 | Lubinski et al. |
| 9,940,013 B2 | 4/2018 | Choi et al. |
| 9,971,407 B2 | 5/2018 | Holenarsipur et al. |
| 9,977,499 B2 | 5/2018 | Westerman et al. |
| 9,990,040 B2 | 6/2018 | Levesque |
| 9,996,199 B2 | 6/2018 | Park |
| 10,025,399 B2 | 7/2018 | Kim et al. |
| 10,037,660 B2 | 7/2018 | Khoshkava et al. |
| 10,061,385 B2 | 8/2018 | Churikov |
| 10,069,392 B2 | 9/2018 | Degner et al. |
| 10,078,483 B2 | 9/2018 | Finnan et al. |
| 10,082,873 B2 | 9/2018 | Zhang |
| 10,108,265 B2 | 10/2018 | Harley et al. |
| 10,110,986 B1 | 10/2018 | Min |
| 10,120,446 B2 | 11/2018 | Pance et al. |
| 10,120,478 B2 | 11/2018 | Filiz et al. |
| 10,120,484 B2 | 11/2018 | Endo et al. |
| 10,122,184 B2 | 11/2018 | Smadi |
| 10,133,351 B2 | 11/2018 | Weber et al. |
| 10,139,976 B2 | 11/2018 | Iuchi et al. |
| 10,152,131 B2 | 12/2018 | Grant |
| 10,152,182 B2 | 12/2018 | Haran et al. |
| 10,235,849 B1 | 3/2019 | Levesque |
| 10,275,075 B2 | 4/2019 | Hwang et al. |
| 10,282,014 B2 | 5/2019 | Butler et al. |
| 10,289,199 B2 | 5/2019 | Hoellwarth |
| 10,346,117 B2 | 7/2019 | Sylvan et al. |
| 10,372,214 B1 | 8/2019 | Gleeson et al. |
| 10,382,866 B2 | 8/2019 | Min |
| 10,390,139 B2 | 8/2019 | Biggs |
| 10,394,326 B2 | 8/2019 | Ono |
| 10,397,686 B2 | 8/2019 | Forstner |
| 10,430,077 B2 | 10/2019 | Lee |
| 10,437,359 B1 | 10/2019 | Wang et al. |
| 10,556,252 B2 | 2/2020 | Tsang et al. |
| 10,585,480 B1 | 3/2020 | Bushnell et al. |
| 10,649,529 B1 | 5/2020 | Nekimken et al. |
| 10,768,738 B1 | 9/2020 | Wang et al. |
| 10,809,830 B2 | 10/2020 | Kim et al. |
| 2003/0117132 A1 | 6/2003 | Klinghult |
| 2005/0036603 A1 | 2/2005 | Hughes |
| 2005/0191604 A1 | 9/2005 | Allen |
| 2005/0230594 A1 | 10/2005 | Sato et al. |
| 2006/0017691 A1 | 1/2006 | Cruz-Hernandez et al. |
| 2006/0209037 A1 | 9/2006 | Wang et al. |
| 2006/0223547 A1 | 10/2006 | Chin et al. |
| 2006/0252463 A1 | 11/2006 | Liao |
| 2007/0106457 A1 | 5/2007 | Rosenberg |
| 2007/0152974 A1 | 7/2007 | Kim et al. |
| 2008/0062145 A1 | 3/2008 | Shahoian |
| 2008/0062624 A1 | 3/2008 | Regen |
| 2008/0084384 A1 | 4/2008 | Gregorio et al. |
| 2008/0111791 A1 | 5/2008 | Nikittin |
| 2009/0085879 A1 | 4/2009 | Dai et al. |
| 2009/0115734 A1 | 5/2009 | Fredriksson et al. |
| 2009/0166098 A1 | 7/2009 | Sunder |
| 2009/0167702 A1 | 7/2009 | Nurmi |
| 2009/0174672 A1 | 7/2009 | Schmidt |
| 2009/0207129 A1 | 8/2009 | Ullrich et al. |
| 2009/0225046 A1 | 9/2009 | Kim et al. |
| 2009/0243404 A1 | 10/2009 | Kim et al. |
| 2009/0267892 A1 | 10/2009 | Faubert |
| 2010/0116629 A1 | 5/2010 | Borissov et al. |
| 2010/0225600 A1 | 9/2010 | Dai et al. |
| 2010/0231508 A1 | 9/2010 | Cruz-Hernandez et al. |
| 2010/0313425 A1 | 12/2010 | Hawes |
| 2010/0328229 A1 | 12/2010 | Weber et al. |
| 2011/0115754 A1 | 5/2011 | Cruz-Hernandez |
| 2011/0128239 A1 | 6/2011 | Polyakov et al. |
| 2011/0132114 A1 | 6/2011 | Siotis |
| 2011/0169347 A1 | 7/2011 | Miyamoto et al. |
| 2011/0205038 A1 | 8/2011 | Drouin et al. |
| 2011/0261021 A1 | 10/2011 | Modarres et al. |
| 2012/0038469 A1 | 2/2012 | Dehmoubed et al. |
| 2012/0038471 A1 | 2/2012 | Kim et al. |
| 2012/0056825 A1 | 3/2012 | Ramsay et al. |
| 2012/0062491 A1 | 3/2012 | Coni et al. |
| 2012/0113008 A1 | 5/2012 | Makinen et al. |
| 2012/0127071 A1 | 5/2012 | Jitkoff et al. |
| 2012/0235942 A1 | 9/2012 | Shahoian |
| 2012/0249474 A1 | 10/2012 | Pratt et al. |
| 2012/0327006 A1 | 12/2012 | Israr et al. |
| 2013/0016042 A1 | 1/2013 | Makinen et al. |
| 2013/0021296 A1 | 1/2013 | Min et al. |
| 2013/0043670 A1 | 2/2013 | Holmes |
| 2013/0044049 A1 | 2/2013 | Biggs et al. |
| 2013/0076635 A1 | 3/2013 | Lin |
| 2013/0154996 A1 | 6/2013 | Trend et al. |
| 2013/0207793 A1 | 8/2013 | Weaber et al. |
| 2014/0062948 A1 | 3/2014 | Lee et al. |
| 2014/0125470 A1 | 5/2014 | Rosenberg |
| 2014/0168175 A1 | 6/2014 | Mercea et al. |
| 2015/0084909 A1 | 3/2015 | Worfolk et al. |
| 2015/0126070 A1 | 5/2015 | Candelore |
| 2015/0234493 A1 | 8/2015 | Parivar et al. |
| 2015/0293592 A1 | 10/2015 | Cheong et al. |
| 2016/0063826 A1* | 3/2016 | Morrell ............... H04M 19/047 340/407.1 |
| 2016/0098107 A1 | 4/2016 | Morrell et al. |
| 2016/0171767 A1 | 6/2016 | Anderson et al. |
| 2016/0293829 A1 | 10/2016 | Maharjan et al. |
| 2016/0327911 A1* | 11/2016 | Eim ..................... G06F 3/0338 |
| 2016/0328930 A1 | 11/2016 | Weber et al. |
| 2016/0379776 A1 | 12/2016 | Oakley |
| 2017/0003744 A1 | 1/2017 | Bard et al. |
| 2017/0024010 A1 | 1/2017 | Weinraub |
| 2017/0090572 A1* | 3/2017 | Holenarsipur ........ G06F 3/0362 |
| 2017/0090655 A1 | 3/2017 | Zhang et al. |
| 2017/0111734 A1 | 4/2017 | Macours |

(56) References Cited

U.S. PATENT DOCUMENTS

| | | |
|---|---|---|
| 2017/0249024 A1 | 8/2017 | Jackson et al. |
| 2017/0285843 A1 | 10/2017 | Roberts-Hoffman et al. |
| 2017/0336273 A1 | 11/2017 | Elangovan et al. |
| 2017/0357325 A1 | 12/2017 | Yang et al. |
| 2018/0005496 A1* | 1/2018 | Dogiamis .............. G04G 21/00 |
| 2018/0014096 A1 | 1/2018 | Miyoshi |
| 2018/0029078 A1 | 2/2018 | Park et al. |
| 2018/0081438 A1 | 3/2018 | Lehmann |
| 2018/0181204 A1 | 6/2018 | Weinraub |
| 2018/0194229 A1 | 7/2018 | Wachinger |
| 2018/0321841 A1 | 11/2018 | Lapp |
| 2018/0335883 A1 | 11/2018 | Choi et al. |
| 2019/0064997 A1 | 2/2019 | Wang et al. |
| 2019/0073079 A1 | 3/2019 | Xu et al. |
| 2019/0278232 A1 | 9/2019 | Ely et al. |
| 2019/0310724 A1 | 10/2019 | Yazdandoost |
| 2020/0004337 A1 | 1/2020 | Hendren et al. |
| 2020/0233495 A1 | 7/2020 | Bushnell et al. |

FOREIGN PATENT DOCUMENTS

| | | |
|---|---|---|
| CN | 101409164 | 4/2009 |
| CN | 101436099 | 5/2009 |
| CN | 101663104 | 3/2010 |
| CN | 101872257 | 10/2010 |
| CN | 201897778 | 7/2011 |
| CN | 201945951 | 8/2011 |
| CN | 102349039 | 2/2012 |
| CN | 203405773 | 1/2014 |
| CN | 203630729 | 6/2014 |
| CN | 104679233 | 6/2015 |
| CN | 105144052 | 12/2015 |
| CN | 106133650 | 11/2016 |
| CN | 206339935 | 7/2017 |
| CN | 207115337 | 3/2018 |
| DE | 214030 | 3/1983 |
| EP | 1686776 | 8/2006 |
| EP | 2743798 | 6/2014 |
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| KR | 101016208 | 2/2011 |
| KR | 20130137124 | 12/2013 |
| TV | 2010035805 | 10/2010 |
| TW | 201430623 | 8/2014 |
| WO | WO2002/073587 | 9/2002 |
| WO | WO2006/091494 | 8/2006 |
| WO | WO2007/049253 | 5/2007 |
| WO | WO2007/114631 | 10/2007 |
| WO | WO2009/038862 | 3/2009 |
| WO | WO2009/156145 | 12/2009 |
| WO | WO2010/129892 | 11/2010 |
| WO | WO2013/169303 | 11/2013 |
| WO | WO2014/066516 | 5/2014 |
| WO | WO2014/200766 | 12/2014 |
| WO | WO2016/091944 | 6/2016 |
| WO | WO2016/144563 | 9/2016 |

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

Stein et al., "A process chain for integrating piezoelectric transducers into aluminum die castings to generate smart lightweight structures," Results in Physics 7, pp. 2534-2539, 2017.

"Lofelt at Smart Haptics 2017," Auto-generated transcript from YouTube video clip, uploaded on Jun. 12, 2018 by user "Lofelt," Retrieved from Internet: <https://www.youtube.com/watch?v=3w7LTQkS430>, 3 pages.

"Tutorial: Haptic Feedback Using Music and Audio—Precision Microdrives," Retrieved from Internet Nov. 13, 2019: https://www.precisionmicrodrives.com/haptic-feedback/tutorial-haptic-feedback-using-music-and-audio/, 9 pages.

"Feel what you hear: haptic feedback as an accompaniment to mobile music playback," Retrieved from Internet Nov. 13, 2019: https://dl.acm.org/citation.cfm?id=2019336, 2 pages.

"Auto Haptic Widget for Android," Retrieved from Internet Nov. 13, 2019, https://apkpure.com/auto-haptic-widget/com.immersion.android.autohaptic, 3 pages.

D-BOX Home, Retrieved from Internet Nov. 12, 2019: https://web.archive.org/web/20180922193345/https://www.d-box.com/en, 4 pages.

* cited by examiner

WEARABLE ELECTRONIC DEVICE WITH HAPTIC ROTATABLE INPUT

CROSS-REFERENCE TO RELATED APPLICATIONS

This application is a nonprovisional patent application of, and claims the benefit of, U.S. Provisional Patent Application No. 62/725,262, filed Aug. 30, 2018 and titled "Wearable Electronic Device With Haptic Rotatable Input," the disclosure of which is hereby incorporated by reference in its entirety.

FIELD

Embodiments described herein generally relate to electronic devices having an input mechanism that may rotate and translate and through which a haptic output is provided. More particularly, embodiments described herein take the form of an electronic smart watch having a crown configured to provide at least two types of input for the smart watch, as well as configured to provide haptic output.

BACKGROUND

Electronic devices, such as electronic smart watches, may employ a crown as an input mechanism. The crown may provide input, but tactile feedback during the input, or in response to the input, may be lacking. This results in an unsatisfactory interaction with the input mechanism as the user may not realize whether the input has been received or acknowledged by the electronic device.

SUMMARY

Embodiments described herein generally relate to electronic devices, and particularly electronic devices having an input mechanism that can rotate and translate to provide two different types of input, as well as being operable to provide haptic output.

One embodiment takes the form of an electronic watch, comprising: a housing; a display coupled to the housing; a crown configured to accept an input and comprising: a crown body outside the housing; and a shaft extending from the crown body into the housing; and an actuator coupled to the crown and configured to provide haptic output through the crown; wherein: the display is configured to change a graphical output in response to the input to the crown.

Still another embodiment takes the form of an electronic watch, comprising: a housing; a crown body; a shaft extending from the crown body through the housing; an actuator operably connected to the shaft; an internal input structure operably connected to the shaft; a processing unit operably connected to the internal input structure and the actuator; a display attached to the housing; and a battery configured to supply power to the processing unit and the actuator; wherein: the internal input structure is configured to receive an input through the shaft and the crown body; the processing unit is configured to instruct the actuator to provide a haptic output in response to the input; and the actuator is configured to provide the haptic output by moving the shaft.

Yet another embodiment takes the form of a method for operating an electronic watch, comprising: receiving an input at a crown extending through a housing of the electronic watch; in response to the input, changing a graphical output of a display attached to the housing; and further in response to the input, providing a haptic output through the crown.

In addition to the aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
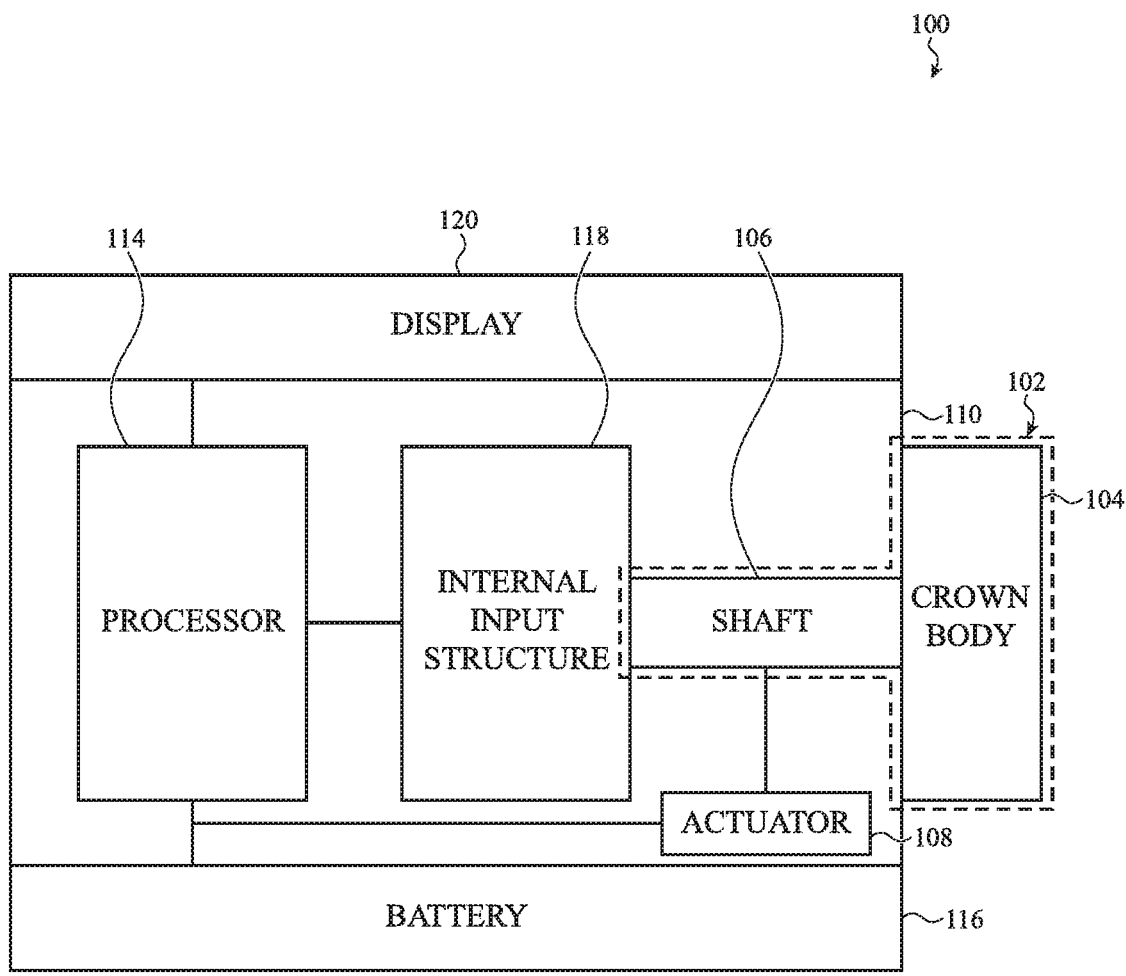
FIG. 1 is a block diagram of a sample electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Embodiments described herein include electronic devices with input mechanisms that are configured to provide multiple types of input, as well as communicate haptic output. For example, an electronic device may be an electronic smart watch and its input mechanism may be a crown. The crown may rotate to provide a first input type, translate to provide a second input type, and detect changes in voltage of an object in contact with it to provide a third input type. Further, an actuator may be physically and/or operably connected to the crown, such that haptic output generated by the actuator is transmitted through the crown to a user in contact with the crown.

Certain embodiments may provide haptic output by translating the input mechanism. For example, the actuator may move a crown along an axis in a first direction with a certain amount of force. This is an example of translational haptic output. Embodiments also may provide haptic output by rotating the input mechanism. For example, the actuator may rotate the crown to provide rotational haptic output. In some embodiments, the axis about which the crown (or other input mechanism) rotates is the same axis along which the crown translates.

In some embodiments, haptic output may be transmitted through the input mechanism but not through a housing and/or display of the electronic device. As another option, haptic output may be transmitted through the input mechanism and through the housing and/or display of the electronic device. In some embodiments, although haptic output is provided through the input mechanism and housing or display, most of the haptic output's force may be transmitted through the input mechanism, or the haptic output may be more perceptible to a wearer or user than any haptic output through the housing. This may facilitate a user perceiving the haptic output as transmitted primarily through the input mechanism, or even completely through the input mechanism. Put another way, the amount of force transmitted through the crown may be sufficiently large that it dominates a user's perception, even though some haptic output passes through other parts of the electronic device. Some embodiments may be configured to adjust an amount of force transmitted through the input mechanism as compared to a second amount transmitted through a housing or other portion of an electronic device, thereby enabling tuning and/or adjustment of haptic output (and thus a user's perception). Further, even in embodiments where the force transmitted through the housing equals or exceeds force transmitted through the crown, the crown may move more than the housing as its mass is smaller. This, in turn, may cause the wearer's or user's perception to be that the crown provides haptic output (e.g., moves) while the housing does not.

In some embodiments, the haptic output may mimic or simulate the feel of detents or stops as a crown rotates. Thus, the haptic output may be applied at certain intervals while the crown rotates and be absent at other intervals, thereby simulating multiple detents during a single rotation or revolution of the crown A "detent," as used herein, refers to the feeling of a mechanical knob rotating against the teeth of an internal gear, such as the "clicking" feeling of winding a mechanical watch. Further, the haptic output may slow rotation of the crown rather than stop, override, or reverse it. Similarly, haptic output may simulate or mimic the feel of a button being depressed, a switch collapsing, and the like when the crown translates. In some embodiments, such haptic output is transmitted primarily through the crown and is imperceptible, or less perceptible, through other parts of the electronic device (such as the housing and display). Various embodiments may have actuators configured to provide adjustable haptic output and/or various types of haptic output.

The term "attached," as used herein, refers to two elements, structures, objects, parts or the like that are physically affixed to one another. The term "coupled," as used herein, refers to two elements, structures, objects, parts, or the like that are physically attached to one another, operate with one another, communicate with one another, are in electrical connection with one another, or otherwise interact with one another. Accordingly, while two elements attached to one another are coupled to one another, the reverse is not required.

FIG. 1 is a block diagram of a sample electronic device 100 that includes an input mechanism 102 configured to provide multiple types of input in response to multiple types of input motion (such as rotation and translation of the input mechanism 102) as well as provide or otherwise transmit haptic output. That is, the input mechanism 102 may both accept input and provide output. In some embodiments, the electronic device 100 is an electronic smart watch and the input mechanism 102 is a crown. Other embodiments may take the form of different wearable devices, such as glasses, jewelry, clothing, and the like, portable computing devices (including tablets and personal digital assistants), laptop or desktop computers, mobile telephones, media players, and so on.

In addition to the input mechanism 102, the electronic device 100 generally includes a housing 110, a processing unit 114, a battery 116, and an actuator 108. The electronic device 100 may include a display 120, as well as an internal input structure 118. The display 120 typically is coupled to the housing 110. Operation of the various components of the electronic device 100 are described below.

In some embodiments, the input mechanism 102 may include, define, be made from, or otherwise incorporate two parts. One part may be external to the housing 110 while the second part may extend through the housing 110. For example, where the electronic device 100 is an electronic watch, the input mechanism 102 may be a crown with a crown body 104 and a shaft 106. The crown body 104 may be connected to, or formed integrally with, the shaft 106 and positioned so that the crown body 104 is outside a housing 110 of the electronic watch while the shaft 106 extends from the crown body 104, through the housing 110, and into an interior of the watch.

Generally, the crown may be used to provide multiple types of input to the electronic watch, including rotational input and translational input. For example, the crown 102 may be manipulated by a user to rotate or translate the crown body 104 and/or shaft 106 (e.g., to provide an input to the watch 100). The shaft 106 may be mechanically, electrically, magnetically, and/or optically coupled to components within the housing 110 that detect motion of the shaft 106 and/or crown body 104, whether rotational, translational, or both. Such components may generate an input in response to the motion of the shaft and/or crown body. As one non-limiting example, translating the crown 102 may close a switch within the housing 110, which may generate a first input. As another non-limiting example, rotating the crown 102 may be detected by an optical sensor, which may generate a second input.

In addition to rotational input and translational input, the crown 102 (or other input mechanism) may be touch-sensitive; a third input may be generated in response to a touch on the crown 102. The crown body 104 may be, function as, or incorporate an electrode to capacitively sense touch, as one example. The crown 102 may also use a thermal, optical, resistive, or other suitable type of sensor to detect touch on the crown body 104. In some embodiments, the crown 102 (and particularly the crown body 104) may function as one lead of an electrocardiogram ("ECG")

sensor. Another electrode (e.g., lead) may be on, or part of, the housing 110 of the electronic device 100 or another external structure on the electronic device 100 and configured to come into contact with a user's skin. In further embodiments, multiple electrodes may be positioned on, or as part of, the housing 110 or another external structure and used as ECG leads.

A user input provided through the crown 102 may be used to manipulate or select various graphics displayed on the display 120, to adjust a volume of a speaker, to turn the watch 100 on or off, and so on. As another example, a user may use the crown 102 to initiate detection of a biological parameter such as a heart rate, electrocardiogram, or blood pressure. In response to an input on or through the crown 102, a display 120 of the electronic watch 100 may show a graphic representing the user's heart rate, blood pressure, or other biological parameter. Haptic output may be provided through a crown of the electronic watch in response to the input and/or displaying the graphic. Continuing the example, the haptic output may match a user's heartbeat. As another example, haptic output may signal a change in information displayed on the display 120.

Generally, a haptic output may be provided through the crown. For example, a haptic actuator may be attached to and/or operably coupled to the crown. As one non-limiting example, a haptic actuator may be operably coupled to the shaft 106, crown body 104, or other part of an input mechanism 102. The actuator 108 may generate haptic output in response to any of an input (which may be provided through the input mechanism 102, display 120, housing 110, or in another manner), output (such as a change in information on the display 120), change in operating status of the electronic device 100, change in state or status of software operated by the processing unit 114 or otherwise on the electronic device 100, receipt or transmission of a communication, a specific time or place being reached, a notification, and so on.

The actuator 108 may be physically coupled to the shaft 106 (or a shaft receiver, as discussed below), or may be operationally coupled thereto but physically decoupled from the shaft 106 (or shaft receiver). If physically coupled to the shaft 106, the actuator 108 may exert mechanical force on the shaft 106 to initiate haptic output through the crown 102. If physically decoupled from the shaft 106, the actuator 108 may use magnetic force to initiate haptic output through the crown 102, or may use electrostatics, ultrasonics, hydraulic pressure, hydrostatic pressure, or the like. The actuator 108 may be, for example, a piezoelectric actuator, a linear actuator or other mass driver, an electromagnet, a bladder, a pump, a piston, and so on. The exact structure of the actuator 108, its method of operation, and placement may vary from embodiment to embodiment.

In some embodiments, the electronic device 100 includes an internal input structure 118 configured to receive or otherwise detect motion of the crown 102 (or other input mechanism). The internal input structure 118 may be a switch that closes in response to the crown 102 translating, a sensor configured to sense the crown 102 rotating, a sensor configured to sense the crown 102 tilting, and so on. Sample sensors that may detect rotation and/or other motion of the crown 102 include optical sensors, capacitive sensors, mechanical sensors, electrical sensors, magnetic sensors, and so on. There may be multiple internal input structures 118 in a single electronic device 100.

A processing unit 114 is operably connected to the display 120, actuator 108, internal input structure 118 (if present), and/or crown 102. The processing unit 114 may receive input from an internal input structure 118 and/or directly from the crown 102, may control operation of the actuator 108 to provide haptic output through the crown 102, may control the display 120 to modify information displayed thereon, and generally operate various functions, features, and software of the electronic watch 100.

A battery 116 may provide power to the processing unit 114, actuator 108, display 120, internal input structure 118, and any other part of the smart electronic watch 100 (or other electronic device).

Figure 2:
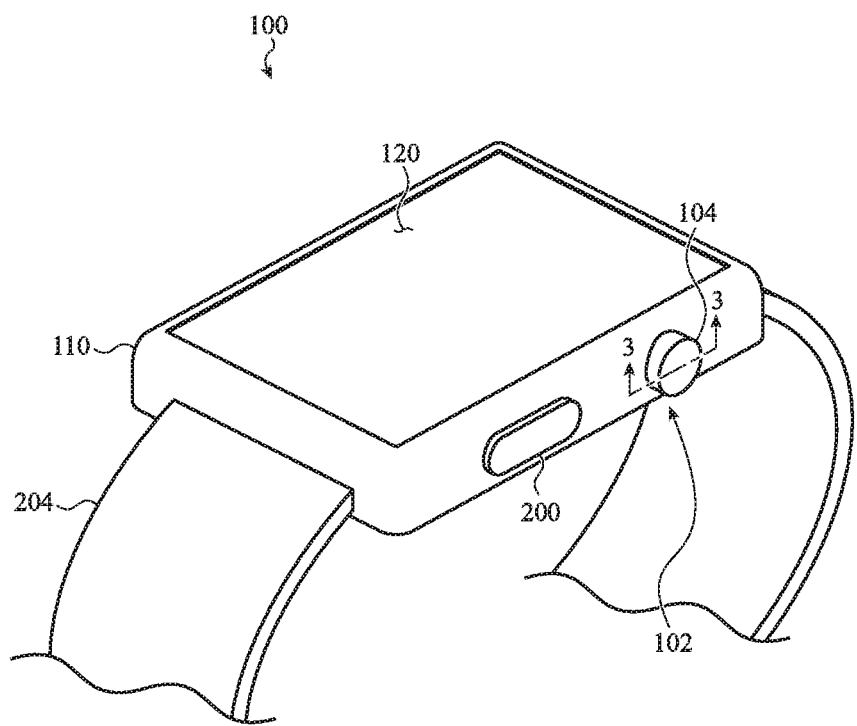
FIG. 2 illustrates an electronic watch.

FIG. 2 illustrates a sample electronic device 100, here embodied as an electronic smart watch. The housing 110 may include a front-side housing member that faces away from a user's skin when the watch 100 is worn by a user, and a back-side housing member that faces toward the user's skin when worn. Alternatively, the housing 110 may be formed as a single member, or as more than two housing members. The one or more housing members may be metallic, plastic, ceramic, crystal, or other types of housing members (or combinations of such materials).

As discussed with respect to FIG. 1, a crown 102 may be manipulable to provide multiple types of input to the electronic watch 100 and may provide haptic output to a user touching the crown 102 (and particularly the crown body 104). The crown body 104 may be positioned such that a user may rotate the crown body 104 (and thus the shaft 106), may touch the crown body 104, and/or may exert force on the crown body 104 (for example, to move the crown body 104 towards the housing 110 or laterally with respect to the housing 110). Any or all of these actions may constitute user input.

The display 120 may include a cover attached to a housing 110 of the electronic device 100. The display 120 also may include a screen below the cover that is configured to display information, including graphics, symbols, text, and the like. The screen may be implemented as an OLED, LED, LCD, or any other suitable type of screen. The display 120 may be received at least partially within the housing 110.

The display 120 may be touch-sensitive and/or force-sensitive. The display 120 may be configured to depict a graphical output of the watch 100, and a user may interact with the graphical output (e.g., using a finger or stylus). As one example, the user may select (or otherwise interact with) a graphic, icon, or the like presented on the display by touching or pressing on the display at the location of the graphic. The cover (e.g., outer surface of the display 120) may form a part of or be attached to the housing 110. In some examples, the cover may be crystal, such as a sapphire crystal. The cover may alternatively be formed of glass, plastic, or other materials. The cover may be transparent or translucent to some or all wavelengths of electromagnetic radiation, including visible light. In some embodiments, the actuator 108 may provide haptic output through the display 120 and associated cover instead of, or in addition to, through the crown 102.

The housing 110 may also include an aperture through which a button 200 protrudes. The button 200 may likewise be used to provide input to the electronic device 100. In some embodiments, the button 200 may provide haptic output in addition to, or instead of, the crown 102. Thus, the description herein regarding providing haptic output through (e.g., transmitted by, through, or along) the crown 102 applies equally to haptic output through the button 200.

The electronic watch 100 may include a band 204, which may be removably attached to the housing 110. The housing 110 may include structures for attaching the watch band 204 to the watch body. In some cases, the structures may include elongate recesses or apertures through which ends of the watch band 204 may be inserted and attached to the watch housing 110. In other cases (not shown), the structures may include indents (e.g., dimples or depressions) in the housing 110, which indents may receive ends of spring pins that are attached to or threaded through ends of a watch band to attach the watch band to the watch body.

In some examples, the watch 100 may lack the display 120 (and/or its cover), the crown 102, or the button 200. For example, the watch 100 may include an audio input or output interface, a touch input interface, an output interface, or other input or output interface that does not require the display 120, crown 102, or button 200. The watch 100 may also include the afore-mentioned input or output interfaces in addition to the display 120, crown 102, or button 200. When the watch 100 lacks the display 120, the front side of the watch 100 may be covered by a housing member that is opaque.

Figure 3A:
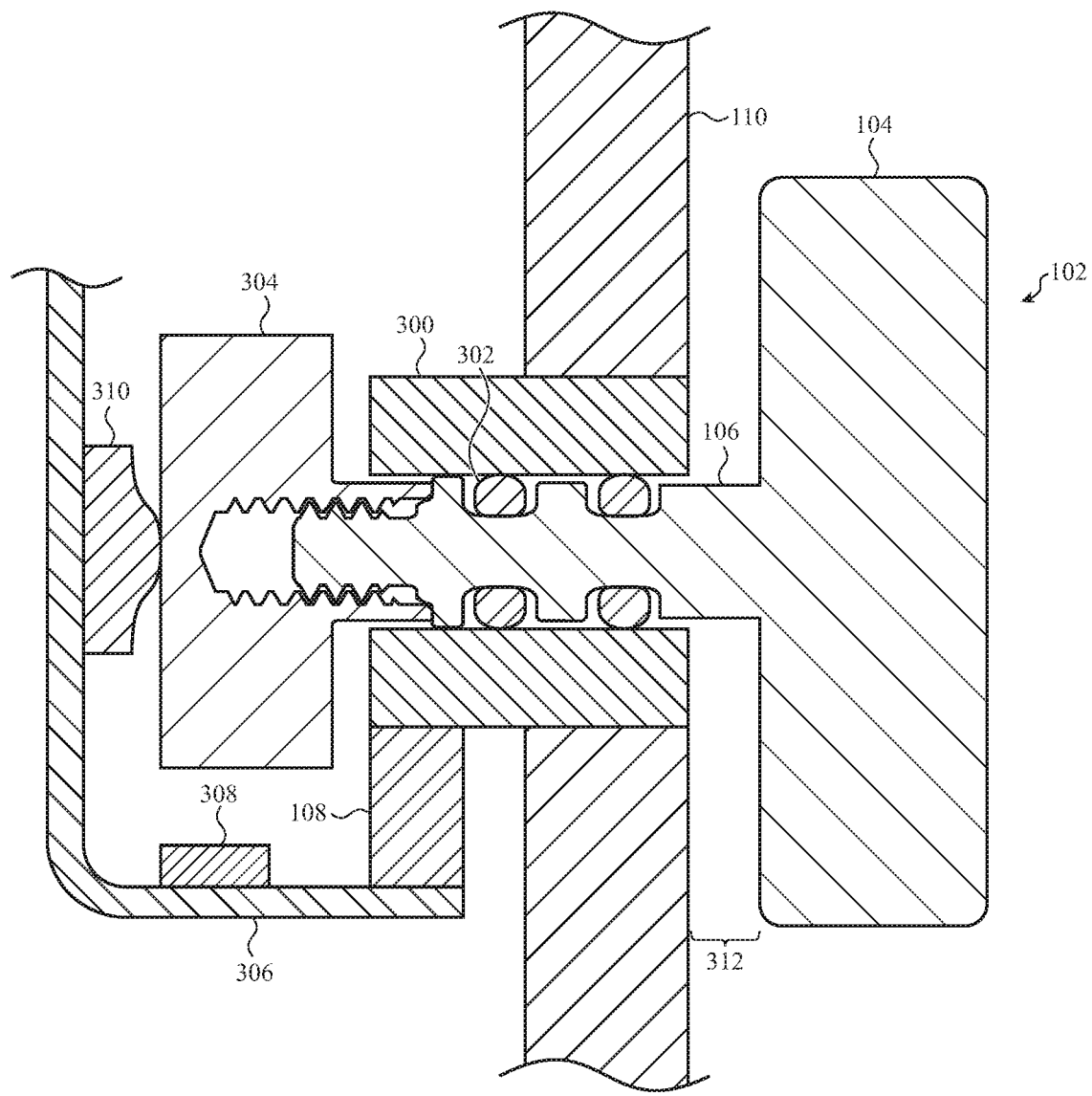
FIG. 3A is a cross-section of a crown of the electronic watch of FIG. 2.

FIG. 3A is a cross-sectional view of the crown 102 taken along line 3-3 of FIG. 2. As shown, the crown 102 includes a crown body 104 and shaft 106. The crown body 104 and shaft 106 are shown as integrally formed with one another, although in other embodiments they may be separate pieces attached to one another. Further, either or both of the crown body 104 and shaft 106 may be formed from multiple separate pieces.

The shaft 106 extends through the housing 110, and specifically through a collar 300 attached to the housing 110. The collar 300 may be configured to reduce and/or prevent tilting of the shaft 106, although in some embodiments the collar 300 may permit the shaft to tilt to a certain extent. The collar 300 may also electrically insulate the shaft 106 from the housing 110. A set of O-rings 302 or other seals prevent water, dust, and the like from entering an interior of the housing 110 along the shaft 106.

A shaft receiver 304 is attached to an end of the shaft 106; some embodiments may omit the shaft receiver 304 and/or collar 300. The shaft receiver 304 generally moves with the shaft 106 while the collar 300 does not. The shaft receiver 304 may be patterned, marked, or otherwise configured to reflect light as it rotates. A sensor 308 (which is one example of an internal input structure 118) may emit light toward the shaft receiver 304 and receive light reflected from the shaft receiver 304. As the shaft rotates, the amount, pattern, intensity, or other parameter of the light reflected by the shaft 106 (and received by the optical sensor 308) may change. Such changes may be cause the sensor 308 to output an input signal that may be correlated to a speed and/or amount of rotation by the sensor 308 or by an associated processing unit 114.

A switch 310 is positioned adjacent or near an end of the shaft 106 or shaft receiver 304 (if present). As the shaft 106 translates towards the housing 110, the shaft receiver 304 may collapse or close the switch 310. The switch 310, in turn, generates an input signal indicating the crown 102 has been pressed. In some embodiments, the switch 310 may be separated from the shaft receiver 304 and/or shaft 106 by a shear plate, membrane, or other structure configured to permit the switch 310 to close in response to the crown 102 translating, but prevent the switch 310 from wearing down as the crown 102 (and thus shaft receiver 304) rotates.

The crown body 104 may be rotated about an axis of rotation by a user. Such rotation likewise rotates the shaft 106 and shaft receiver 304, but typically does not cause the collar 300 to rotate (although it may in some embodiments). Generally, the axis about which the crown body 104 and shaft 106 rotates extends through a center of the crown body 104 and shaft 106. The crown body 104 and shaft 106 also translate along this axis of rotation, in certain embodiments.

An internal support 306 supports, and is attached to, the switch 310, sensor 308, and optionally the actuator 108. In some embodiments, different internal supports may be used for each or any of the switch 310, sensor 308, and actuator 108. For example, the actuator 108 may be attached directly to the housing 110.

The actuator 108 may be physically coupled to the shaft 106 (or shaft receiver 304), or may be operationally coupled thereto but physically decoupled from the shaft 106 (or shaft receiver 304). If physically coupled to the shaft 106, the actuator 108 may exert mechanical force on the shaft to initiate haptic output through the crown 102. If physically decoupled from the shaft 106, the actuator 108 may use electromagnetic force to initiate haptic output through the crown 102, or may use electrostatics, ultrasonics, hydraulic pressure, hydrostatic pressure, or the like. The actuator 108 may be, for example, a piezoelectric actuator, a linear actuator or other mass driver, an electromagnet, a bladder, a pump, a piston, and so on. The exact structure of the actuator 108, its method of operation, and placement may vary from embodiment to embodiment. In many embodiments, the actuator 108 provides haptic output to or through the crown 102 in response to an input provided to or through the crown 102. For example, rotating the crown 102 may cause the actuator 108 to provide an output, as may pressing the crown. It should be appreciated that each type or mode may cause the actuator 108 to provide a different haptic output, at least in some embodiments. In other embodiments, two or more input types or modes can trigger the same haptic output, although multiple types of haptic output may still be provided.

The crown body 104 is separated from the housing 110 by a gap 312. FIG. 3A illustrates the gap 312 in a nominal or default state (e.g., one where no input force or haptic output force is exerted on the crown 102).

Figure 3B:
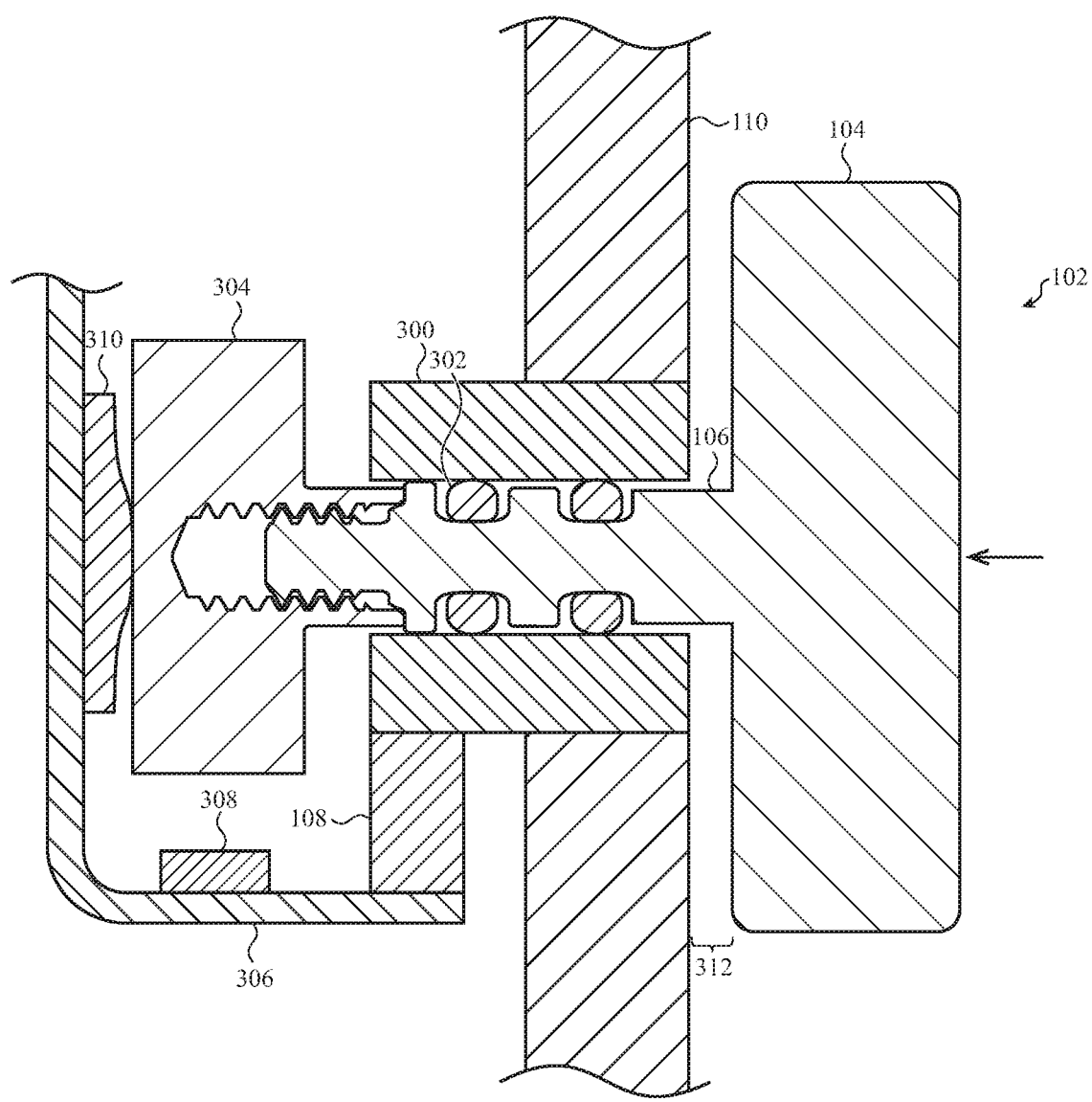
FIG. 3B is a cross-section of the crown of FIG. 2, showing the crown undergoing a first type of haptic output.

By contrast, FIG. 3B illustrates the crown 102 when a force moves the crown body 104 toward the housing 110. In some embodiments the actuator 108 may pull the crown body 104 toward the housing 110, thereby narrowing the gap 312 as shown in FIG. 3B. The motion of the crown body 104 may be perceived by a person touching the crown body 104 as a haptic output.

Figure 3C:
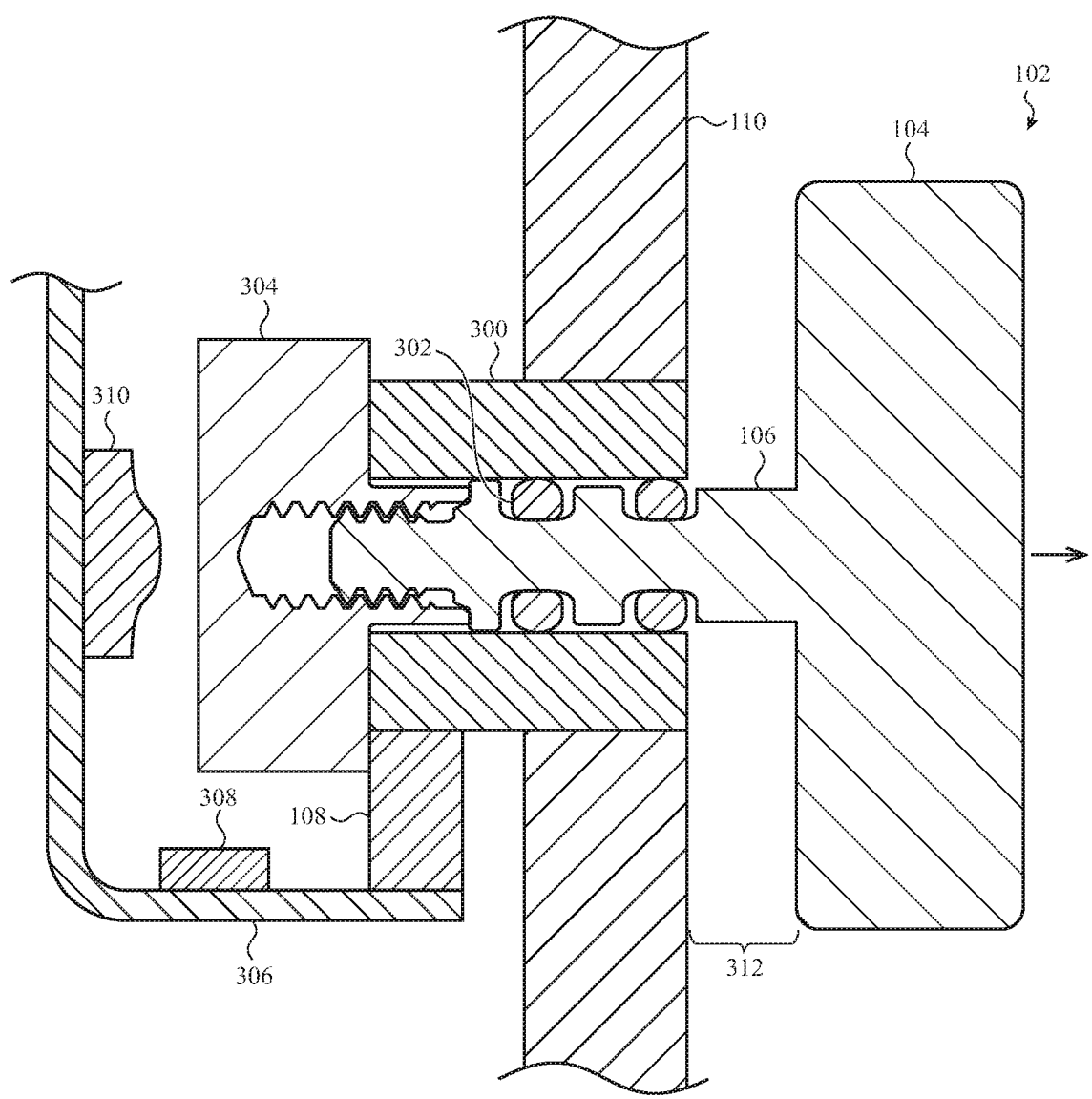
FIG. 3C is a cross-section of the crown of FIG. 2, showing the crown undergoing a second type of haptic output.

As another option, the actuator 108 may move the crown 102 outward, such that the crown body 104 moves away from the housing 110. FIG. 3C illustrates the crown 102 undergoing such haptic output. Here, the actuator 108 exerts an outward force on the shaft 106 (or crown body 104, depending on the positioning of the actuator 108 within or outside the housing 110) such that the gap 312 increases. The maximum distance the crown body 104 may travel (and thus the size of the gap 312) may be set by the distance between the shaft receiver 304 (or another structural element, such as a plate, ledge, projection, protrusion, or the like) and the collar 300 (or the housing 110) when the crown 102 is in its rest state. In some embodiments, the actuator 108 may move the crown body 104 away from the housing 110 in response to a user providing an input, such as pressing the crown 102 toward the housing 110.

Figure 3D:
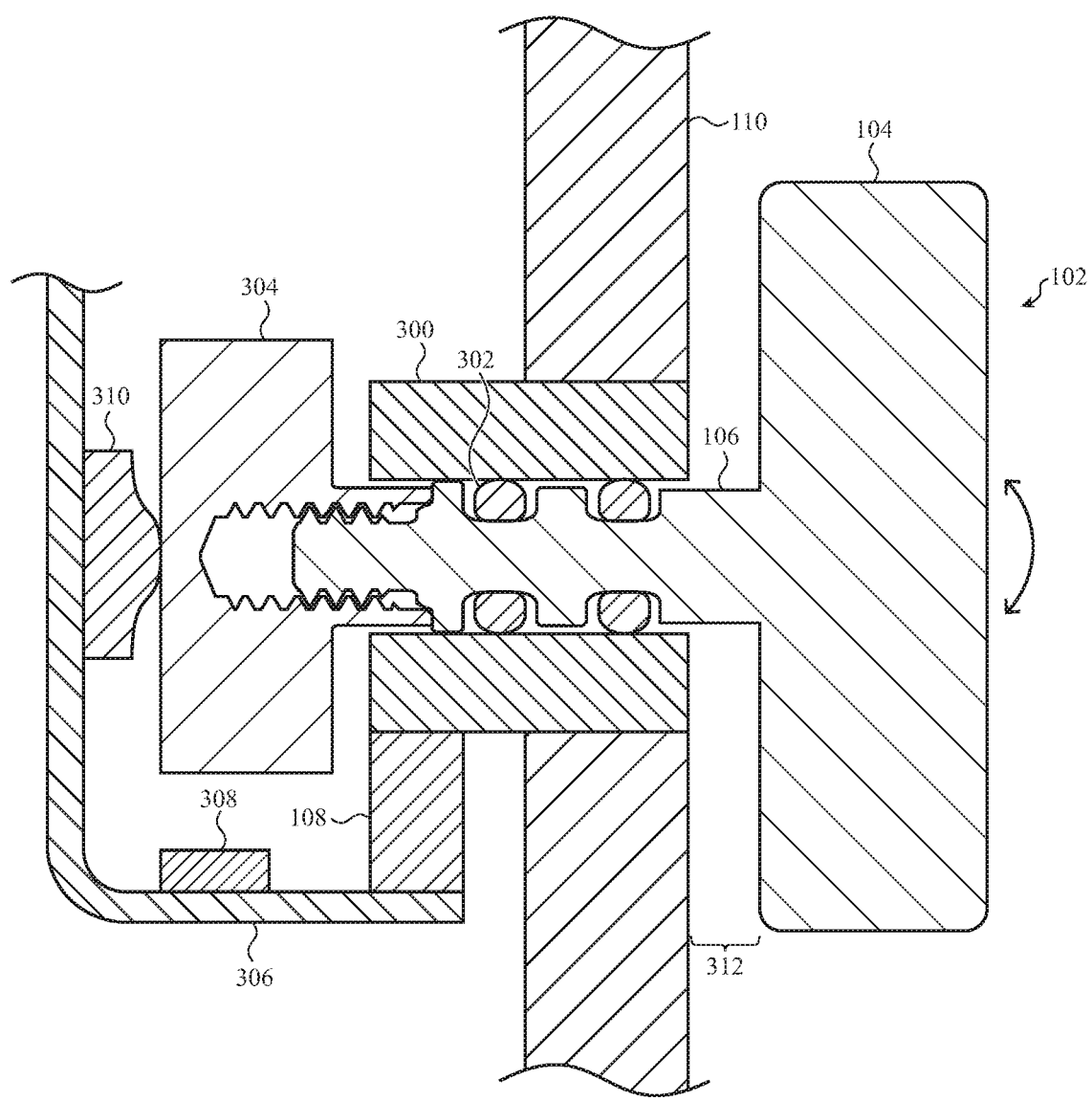
FIG. 3D is a cross-section of the crown of FIG. 2, showing the crown undergoing a third type of haptic output.

FIG. 3D illustrates yet another type of haptic output provided through the crown 102 by the actuator 108. Here, the actuator 108 rotates the shaft 106 and crown body 104 about the crown's axis of rotation. A user touching the crown body 104 may feel its rotation, which may stretch or shear the user's skin contacting the crown body 104. This is a third type of haptic output that may be provided by the actuator 108 through the crown 102.

As previously mentioned, haptic output may take the form of stopping crown 102 motion as well as moving the crown 102. For example, the actuator 108 may periodically stop or slow rotation of the crown body 104 by braking the shaft 106 or crown body 104. This change in rotational speed may be perceived by the user as yet another type of haptic output, for example in response to a rotational input. Similarly, the actuator 108 may accelerate rotation of the crown 102 to provide yet another type of haptic output. The actuator 108 may be configured to stop, slow, pause, and/or accelerate translation motion of the crown 102, as well, as yet more examples of haptic output.

In some embodiments, the actuator 108 may move, shake, vibrate, or otherwise impact the housing 110 in addition to the crown 102 when providing haptic output. An electronic watch 100 or other device may incorporate multiple actuators 108, such that one acts on the housing 110 while another acts on the crown 102. Yet another actuator 108 may act on the display 120. In still other embodiments, a single actuator 108 is used and the waveform produced by the actuator 108 is tuned to channel a majority of the actuator's force through the crown 102 rather than the housing 110, thereby ensuring a majority of the haptic output passes through or along the crown 102. In yet other embodiments, the actuator 108 is configured to move the crown 102 more than the housing 110 even though the housing 110 may be subjected to as much or more of the actuator's force than the crown 102.

Figure 4A:
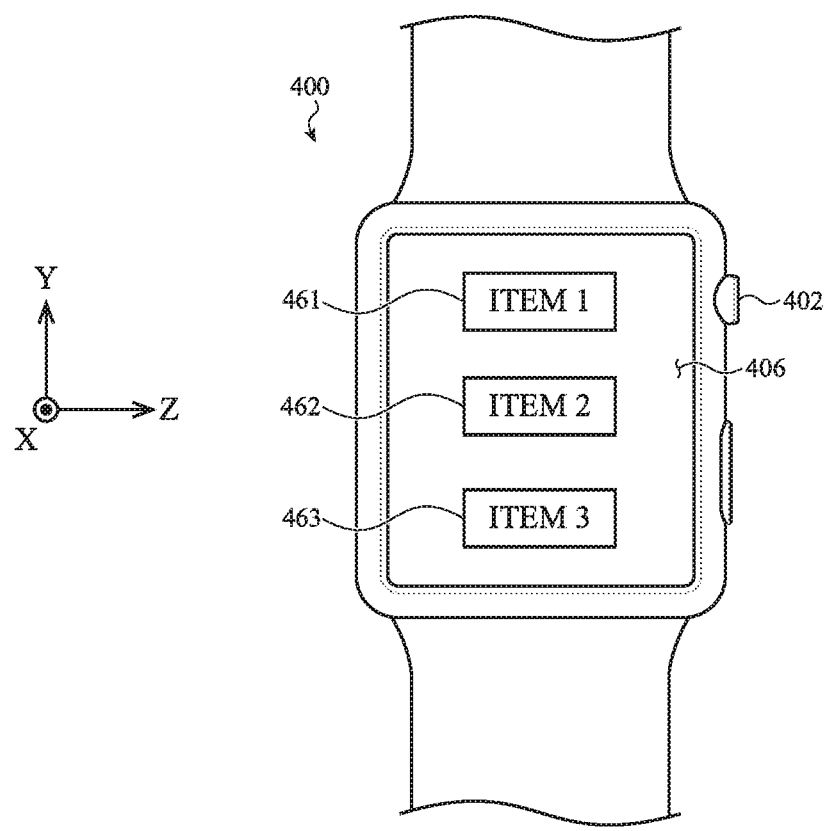
FIGS. 4A-6B show an electronic watch displaying various information in response to inputs provided by the crown, and in response to which haptic outputs may be provided through the crown.
Figure 4B:
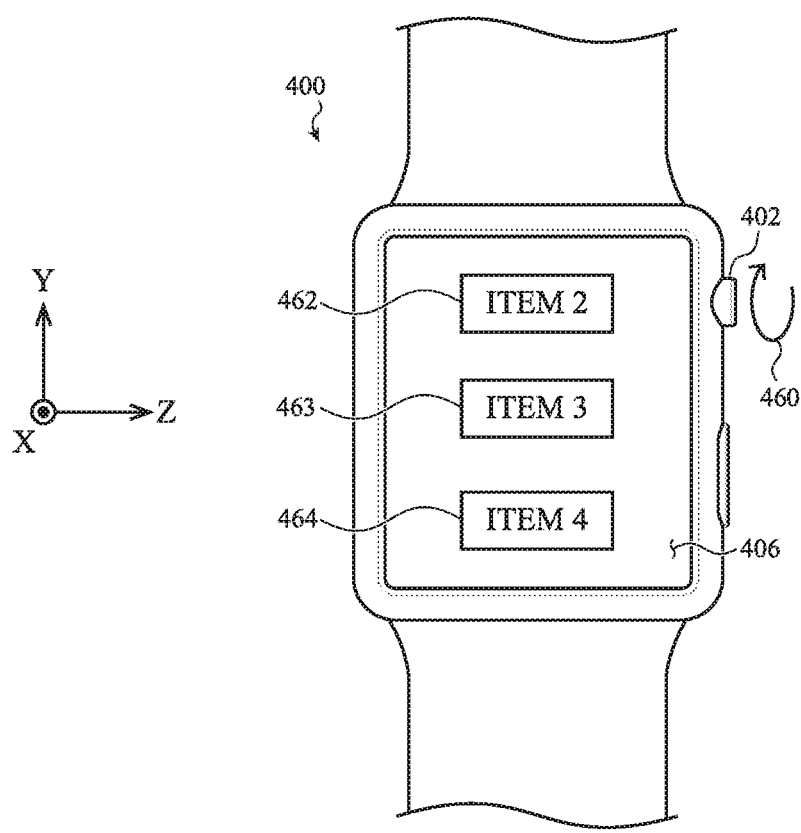

As discussed above, graphics displayed on the electronic devices herein may be manipulated through inputs provided to a crown. FIGS. 4A-4B generally depict examples of changing a graphical output displayed on an electronic device through inputs provided by force and/or rotational inputs to a crown assembly of the device. This manipulation (e.g., selection, acknowledgement, motion, dismissal, magnification, and so on) of a graphic, through inputs to the crown, may result in changes in operation of the electronic device and/or graphical output displayed by the electronic device. Although specific examples are provided and discussed, many operations may be performed by rotating and/or applying force to a crown such as the examples described above. Accordingly, the following discussion is by way of example and not limitation. Haptic output may be generated by an actuator 108 and transmitted through a crown 402 in response to any of the changes in output discussed herein. Further, insofar as the actuator 108 may provide haptic output in response to the same input that results in changes in graphical output on the display, the changes in graphical output and haptic output may occur substantially simultaneously. "Substantially simultaneously" generally means sufficiently close in time together that a user perceives the two as occurring at the same time, or, in some embodiments, within about 1-20 milliseconds of one another, or 1-150 milliseconds of one another in still other embodiments.

FIG. 4A depicts an example electronic device 400 (shown here as an electronic watch) having a crown 402. The crown 402 may be similar to the examples described above, and may receive force inputs along a first lateral direction, a second lateral direction, or an axial direction of the crown. The crown 402 may also receive rotational inputs. A display 406 provides a graphical output (e.g., shows information and/or other graphics). In some embodiments, the display 406 may be configured as a touch-sensitive display capable of receiving touch and/or force input. In the current example, the display 406 depicts a list of various items 461, 462, 463, all of which are example graphical outputs.

FIG. 4B illustrates how the graphical output shown on the display 406 changes as the crown 402 rotates, partially or completely (as indicated by the arrow 460). Rotating the crown 402 causes the list to scroll or otherwise move on the screen, such that the first item 461 is no longer displayed, the second and third items 462, 463 each move upwards on the display, and a fourth item 464 is now shown at the bottom of the display 406. This is one example of a scrolling operation that can be executed by rotating the crown 402. Such scrolling operations may provide a simple and efficient way to depict multiple items relatively quickly and in sequential order. In some examples, the items may be used to trigger various aspects of the optical sensor subsystems described herein, or to select various outputs of the optical sensor subsystems for further review. A speed of the scrolling operation may be controlled by the amount of rotational force applied to the crown 402 and/or the speed at which the crown 402 is rotated. Faster or more forceful rotation may yield faster scrolling, while slower or less forceful rotation yields slower scrolling. In some embodiments, rotation of the crown causes not only scrolling of the graphical output but also haptic output simulating one or more detents as the crown rotates, as discussed above.

The crown 402 may receive an axial force (e.g., a force inward toward the display 406 or watch body) to select an item from the list, in certain embodiments. Likewise, faster or more forceful rotation (or translation) of a crown 402 may yield faster or harder haptic output through the crown 402, while slower or less forceful rotation or translation yields slower or less forceful haptic output. Put another way, haptic output transmitted through the crown may vary to match a parameter of an input or other output, such as speed, force, magnitude, and the like.

Figure 5A:
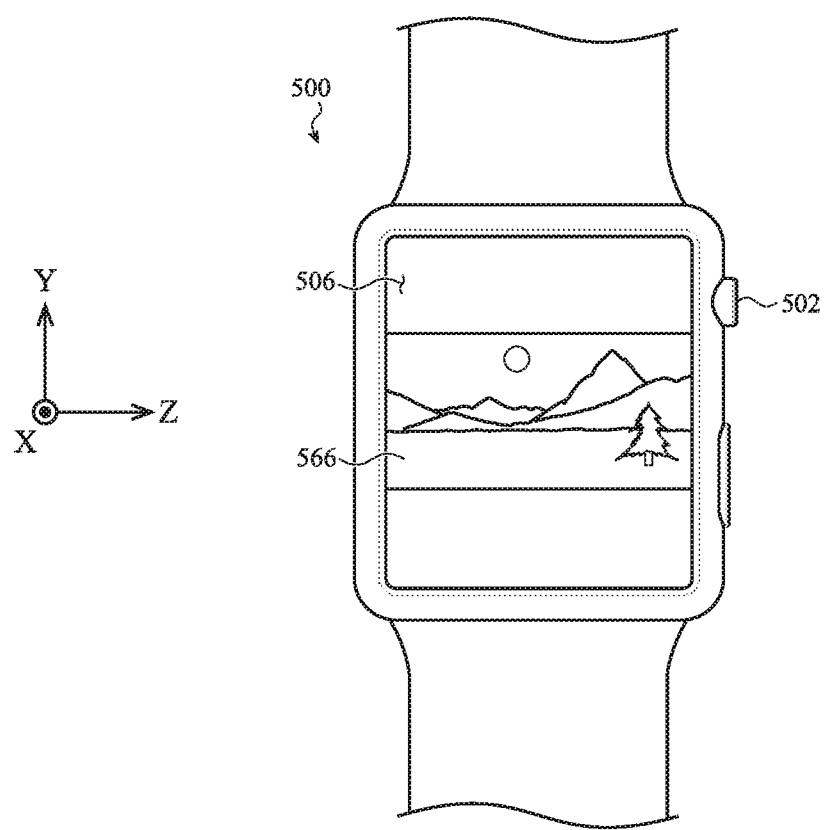
Figure 5B:
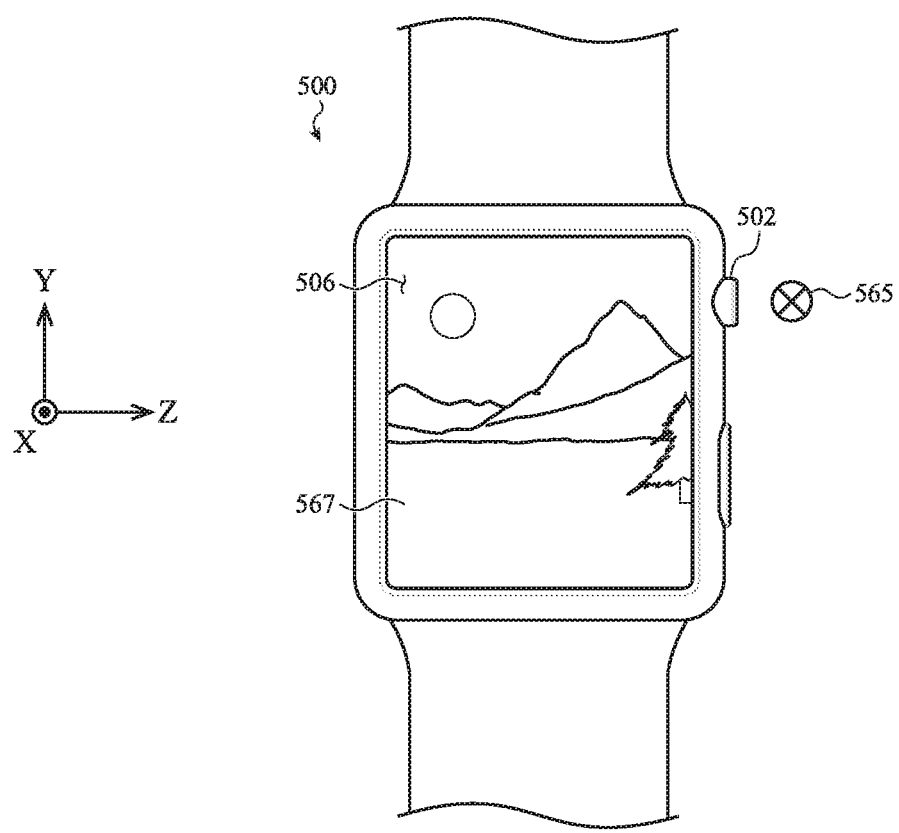

FIGS. 5A and 5B illustrate an example zoom operation; haptic output may be provided through a crown as the zoom operation is carried out. The display 506 depicts a picture 566 at a first magnification, shown in FIG. 5A; the picture 566 is yet another example of an indicium. A user may apply a lateral force (e.g., a force along the x-axis) to the crown 502 of the electronic device 500 (illustrated by arrow 565), and in response the display 506 may zoom into the picture 566, such that a portion 567 of the picture is shown at an increased magnification. This is shown in FIG. 5B. The direction of zoom (in vs. out) and speed of zoom, or location of zoom, may be controlled through force applied to the crown 502, and particularly through the direction of applied force and/or magnitude of applied force. Applying force to the crown 502 in a first direction may zoom in, while applying force to the crown 502 in an opposite direction may zoom out. Alternately, rotating or applying force to the crown 502 in a first direction may change the portion of the picture subject to the zoom effect. In some embodiments, applying an axial force (e.g., a force along the z-axis) to the crown 502 may toggle between different zoom modes or inputs (e.g., direction of zoom vs. portion of picture subject to zoom). In yet other embodiments, applying force to the crown 502 along another direction, such as along the y-axis, may return the picture 566 to the default magnification shown in FIG. 5A.

Figure 6A:
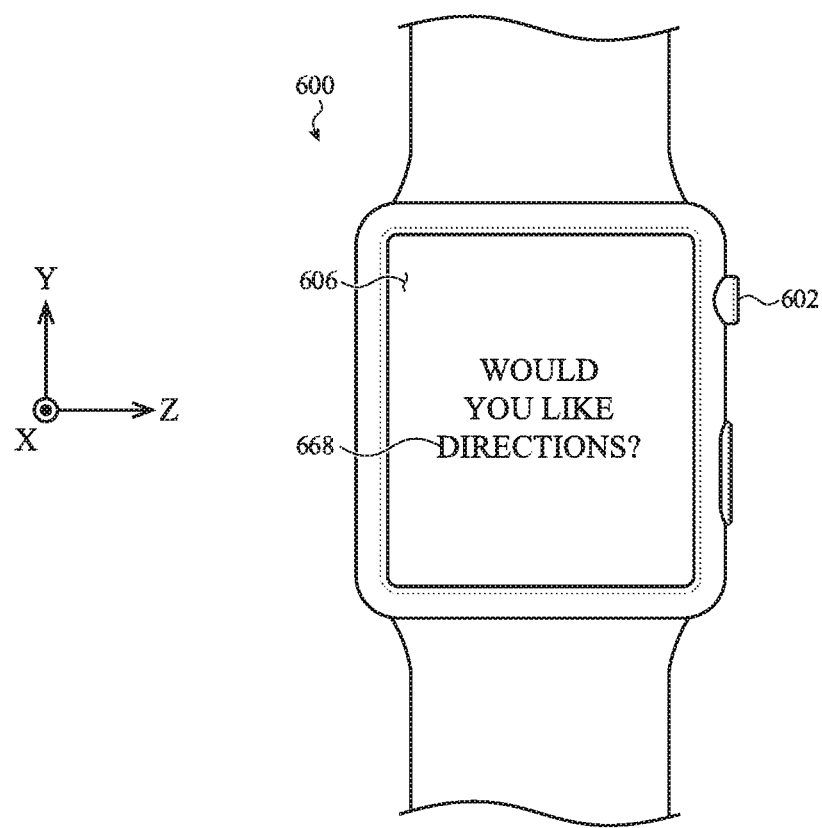
Figure 6B:
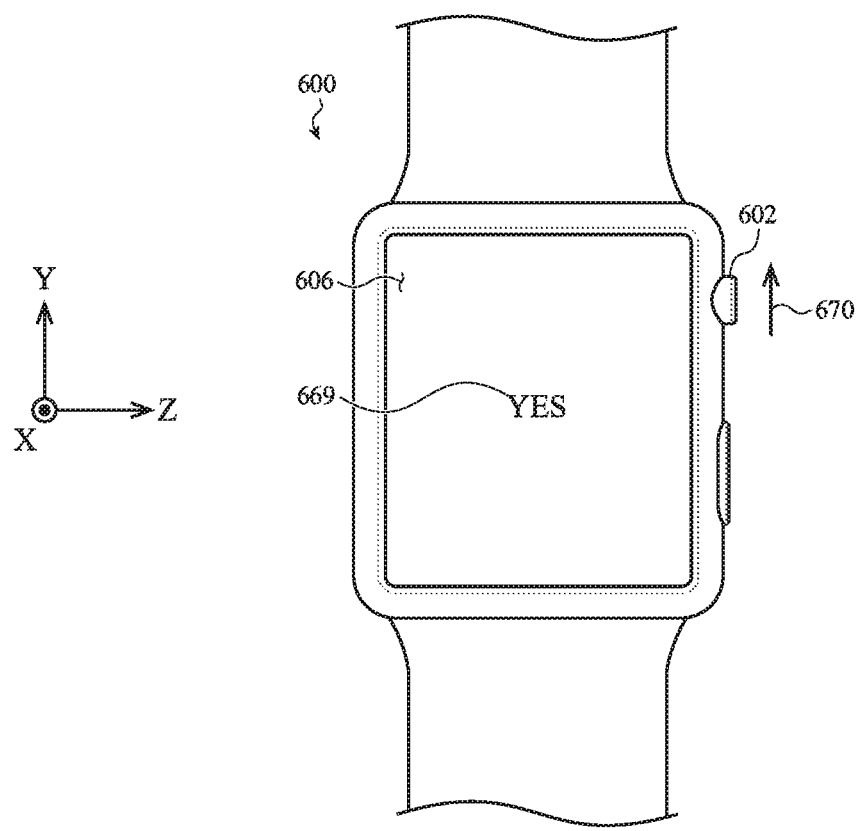

FIGS. 6A and 6B illustrate possible use of the crown 602 to change an operational state of the electronic device 600 or otherwise toggle between inputs; haptic output may be provided through the crown 602 in response to such changes or toggles. Turning first to FIG. 6A, the display 606 depicts a question 668, namely, "Would you like directions?" As shown in FIG. 6B, a lateral force may be applied to the crown 602 (illustrated by arrow 670) to answer the question. Applying force to the crown 602 provides an input interpreted by the electronic device 600 as "yes," and so "YES" is displayed as a graphic 669 on the display 606. Applying force to the crown 602 in an opposite direction may provide a "no" input. Both the question 668 and graphic 669 are examples of graphical outputs. As one non-limiting example, a graphic or other information (such as a map or list of directions) may be shown on the display 606 in response to the user selecting "YES," for example by rotating, translating, or touching the crown 602. Haptic output may be provided through the crown 602 and linked to the displayed information; as one example, haptic output may be provided through the crown 602 whenever a user approaches a turn or other change in route or next step in the list of directions.

In the embodiment shown in FIGS. 6A and 6B, the force applied to the crown 602 is used to directly provide the input, rather than select from options in a list (as discussed above with respect to FIGS. 4A and 4B).

As mentioned previously, force or rotational input to a crown of an electronic device may control many functions beyond those listed here. The crown may receive distinct force or rotational inputs to adjust a volume of an electronic device, a brightness of a display, or other operational parameters of the device. A force or rotational input applied to the crown may rotate to turn a display on or off, or turn the device on or off. A force or rotational input to the crown may launch or terminate an application on the electronic device. Further, combinations of inputs to the crown may likewise initiate or control any of the foregoing functions, as well.

In some cases, the graphical output of a display may be responsive to inputs applied to a touch-sensitive display (e.g., displays 406, 506, 606, and the like) in addition to inputs applied to a crown. The touch-sensitive display may include or be associated with one or more touch and/or force sensors that extend along an output region of a display and which may use any suitable sensing elements and/or sensing techniques to detect touch and/or force inputs applied to the touch-sensitive display. The same or similar graphical output manipulations that are produced in response to inputs applied to the crown may also be produced in response to inputs applied to the touch-sensitive display. For example, a swipe gesture applied to the touch-sensitive display may cause the graphical output to move in a direction corresponding to the swipe gesture. As another example, a tap gesture applied to the touch-sensitive display may cause an item to be selected or activated. In this way, a user may have multiple different ways to interact with and control an electronic watch, and in particular the graphical output of an electronic watch. Further, while the crown may provide overlapping functionality with the touch-sensitive display, using the crown allows for the graphical output of the display to be visible (without being blocked by the finger that is providing the touch input). Likewise, an actuator may produce haptic output in response to an input to or through the crown.

Figure 7:
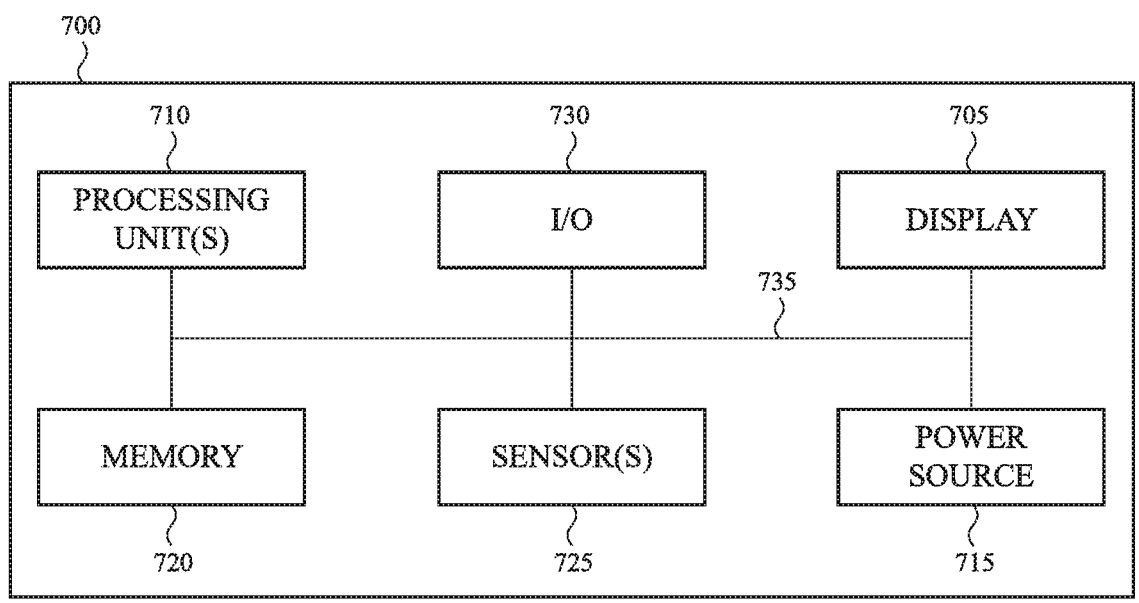
FIG. 7 is a sample system diagram of an example electronic device.

FIG. 7 shows a sample electrical block diagram of an electronic device 700, which electronic device may in some cases take the form of any of the watches or other wearable electronic devices described herein, or other portable or wearable electronic devices. The electronic device 700 can include a display 705 (e.g., a light-emitting display), a processing unit 710, a power source 715, a memory 720 or storage device, a sensor 725, and an input/output (I/O) mechanism 730 (e.g., an input/output device, input/output port, or haptic input/output interface such as an actuator 108 and/or crown 102, or the combination thereof). The processing unit 710 can control some or all of the operations of the electronic device 700. The processing unit 710 can communicate, either directly or indirectly, with some or all of the components of the electronic device 700. For example, a system bus or other communication mechanism 735 can provide communication between the processing unit 710, the power source 715, the memory 720, the sensor 725, and the input/output mechanism 730.

The processing unit 710 can be implemented as any electronic device capable of processing, receiving, or transmitting data or instructions. For example, the processing unit 710 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 700 can be controlled by multiple processing units. For example, select components of the electronic device 700 (e.g., a sensor 725) may be controlled by a first processing unit and other components of the electronic device 700 (e.g., the display 705) may be controlled by a second processing unit, where the first and second processing units may or may not be in communication with each other.

The power source 715 can be implemented with any device capable of providing energy to the electronic device 700. For example, the power source 715 may be one or more batteries or rechargeable batteries. Additionally or alternatively, the power source 715 can be a power connector or power cord that connects the electronic device 700 to another power source, such as a wall outlet.

The memory 720 can store electronic data that can be used by the electronic device 700. For example, the memory 720 can store electrical data or content such as, for example, audio and video files, documents and applications, device settings and user preferences, timing signals, control signals, and data structures or databases. The memory 720 can be configured as any type of memory. By way of example only, the memory 720 can be implemented as random access memory, read-only memory, Flash memory, removable memory, other types of storage elements, or combinations of such devices.

The electronic device 700 may also include one or more sensors 725 positioned almost anywhere on the electronic device 700. The sensor(s) 725 can be configured to sense one or more type of parameters, such as but not limited to, pressure, light, touch, heat, movement, relative motion, biometric data (e.g., biological parameters), and so on. For example, the sensor(s) 725 may include a heat sensor, a position sensor, a light or optical sensor, an accelerometer, a pressure transducer, a gyroscope, a magnetometer, a health monitoring sensor, and so on. Additionally, the one or more sensors 725 can utilize any suitable sensing technology, including, but not limited to, capacitive, ultrasonic, resistive, optical, ultrasound, piezoelectric, and thermal sensing technology.

The I/O mechanism 730 can transmit and/or receive data from a user or another electronic device. An I/O device can include a display, a touch sensing input surface, one or more buttons (e.g., a graphical user interface "home" button), one or more cameras, one or more microphones or speakers, one or more ports such as a microphone port, and/or a keyboard. Additionally or alternatively, an I/O device or port can transmit electronic signals via a communications network, such as a wireless and/or wired network connection. Examples of wireless and wired network connections include, but are not limited to, cellular, Wi-Fi, Bluetooth, IR, and Ethernet connections.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic watch, comprising:
a housing;
a display coupled to the housing;
a crown configured to receive a rotational input, the crown comprising:
a crown body outside the housing; and
a shaft extending from the crown body into the housing; and
a linear actuator coupled to the crown and configured to:
in response to receiving the rotational input at the crown, cause a movement of the crown in a first direction, thereby providing a first haptic output to a finger in contact with the crown body, the first haptic output having a first level of perceptibility along a surface of the crown, the first direction parallel to an axis of rotation of the shaft; and
in response to receiving the rotational input at the crown, cause a movement of the housing in the first direction, thereby providing a second haptic output to skin in contact with the housing, the second haptic output having a second level of perceptibility along a surface of the housing, the first level of perceptibility being greater than the second level of perceptibility.

2. The electronic watch of claim 1, wherein:
the rotational input causes rotation of the shaft;
the electronic watch further comprises:
an optical sensor configured to detect the rotation of the shaft; and
a processing unit operatively connected to the display, the optical sensor, and the linear actuator;
the processing unit is configured to instruct the linear actuator to provide the first haptic output and the second haptic output in response to the optical sensor detecting the rotation of the shaft;
the processing unit is configured to instruct the display to change the graphical output in response to the input;
the first haptic output is transmitted through the shaft to the crown body.

3. The electronic watch of claim 1, wherein the linear actuator is coupled to the shaft.

4. The electronic watch of claim 3, wherein the linear actuator is further coupled to the housing.

5. The electronic watch of claim 1, wherein:
the first haptic output simulates a detent during the rotational input.

6. The electronic watch of claim 5, wherein the first haptic output simulates multiple detents during a single revolution of the crown.

7. The electronic watch of claim 5, wherein:
the crown is further configured to accept a second input that is different from the rotational input;
the linear actuator is further configured to provide a third haptic output through the crown in response to the second input; and
the third haptic output is different from the second haptic output.

8. The electronic watch of claim 7, wherein:
the second input moves the crown toward the housing; and
the third haptic output moves the crown away from the housing.

9. An electronic watch, comprising:
a housing;
a crown body;
a shaft extending from the crown body through the housing;
a linear actuator operably connected to the shaft;
an internal input structure operably connected to the shaft;
a processing unit operably connected to the internal input structure and the actuator;
a display attached to the housing; and
a battery configured to supply power to the processing unit and the linear actuator; wherein:
the internal input structure is configured to detect a rotational input to the crown body;
the processing unit is configured to instruct the linear actuator to provide, in response to the rotational input:
a first haptic output to a finger contacting the crown body; and
a second haptic output to skin contacting the housing; wherein:
the linear actuator is configured to provide the first haptic output by causing the crown body to move in a first direction, the first direction parallel to an axis of rotation of the shaft; and
the linear actuator is configured to provide the second haptic output by causing the housing to move in the first direction.

10. The electronic watch of claim 9, wherein:
moving the linear actuator moves the shaft to provide the first haptic output.

11. The electronic watch of claim 9, wherein:
the electronic watch further comprises the display attached to the housing;
the display is configured to show a graphical output;
the display is configured to change the graphical output in response to the rotational input; and
the graphical output changes substantially simultaneously with the linear actuator providing the first haptic output and the second haptic output.

12. The electronic watch of claim 11, wherein the graphical output changes within 20 milliseconds of the linear actuator providing the first haptic output and the second haptic output.

13. The electronic watch of claim 9, wherein:
the shaft is configured to rotate and translate;
the internal input structure is a first internal input structure configured to detect the rotational input by detecting rotation of the shaft; and
the electronic watch further comprises a second internal input structure configured to detect translation of the shaft.

14. The electronic watch of claim 13, wherein:
- the linear actuator is configured to provide the first haptic output in response to the first internal input structure detecting rotation of the shaft; and
- the linear actuator is configured to provide a third haptic output in response to the second internal input structure detecting translation of the shaft.

15. The electronic watch of claim 14, wherein:
- the display is configured to show a graphical output;
- the display is configured to change the graphical output in a first manner in response to rotation of the shaft; and
- the display is configured to change the graphical output in a second manner in response to translation of the shaft.

16. The electronic watch of claim 15, wherein the display is touch-sensitive.

17. A method for operating an electronic watch, comprising:
- receiving a rotational input at a crown extending through a housing of the electronic watch; and
- in response to the rotational input:
  - changing a graphical output of a display attached to the housing;
  - causing, by a linear actuator, a movement of the crown in a first direction, thereby providing a first haptic output to a finger in contact with the crown, the first haptic output having a first level of perceptibility along a surface of the crown, the first direction parallel to an axis of rotation of the crown; and
  - causing, by the linear actuator, a movement of the housing in the first direction, thereby providing a second haptic output to skin in contact with the housing, the second haptic output having a second level of perceptibility along a surface of the housing, the first level of perceptibility being greater than the second level of perceptibility.

18. The method of claim 17, wherein:
- changing the graphical output comprises scrolling a list; and
- the first haptic output simulates a detent.

* * * * *